(12) United States Patent
Armbruster et al.

(10) Patent No.: US 10,454,848 B2
(45) Date of Patent: Oct. 22, 2019

(54) METHOD FOR OPERATING A COMMUNICATION NETWORK, AND NETWORK ARRANGEMENT

(75) Inventors: Michael Armbruster, München (DE); Ludger Fiege, Grafing (DE); Johannes Riedl, Ergolding (DE); Thomas Schmid, Nürtingen (DE); Andreas Zirkler, München (DE)

(73) Assignee: Siemens Aktiengesellschaft, München (DE)

( * ) Notice: Subject to any disclaimer, the term of this patent is extended or adjusted under 35 U.S.C. 154(b) by 0 days.

(21) Appl. No.: 14/345,610

(22) PCT Filed: Sep. 3, 2012

(86) PCT No.: PCT/EP2012/067110
§ 371 (c)(1),
(2), (4) Date: Mar. 18, 2014

(87) PCT Pub. No.: WO2013/041351
PCT Pub. Date: Mar. 28, 2013

(65) Prior Publication Data
US 2014/0376561 A1 Dec. 25, 2014

(30) Foreign Application Priority Data
Sep. 19, 2011 (DE) .................. 10 2011 082 969

(51) Int. Cl.
*H04L 12/947* (2013.01)
*H04L 12/707* (2013.01)
(Continued)

(52) U.S. Cl.
CPC .......... *H04L 49/25* (2013.01); *G06F 11/1633* (2013.01); *H04L 12/40182* (2013.01);
(Continued)

(58) Field of Classification Search
CPC ... H04L 12/42; H04L 12/437; H04L 12/4637; H04L 45/28; H04L 69/40;
(Continued)

(56) References Cited

U.S. PATENT DOCUMENTS 6,233,702 B1 5/2001 Horst et al.
6,714,973 B1 3/2004 Heiske et al.
(Continued)

FOREIGN PATENT DOCUMENTS

CN 1265795 A 9/2000
CN 1328744 A 12/2001
(Continued)

OTHER PUBLICATIONS

German Office Action cited in DE 10 2011 082 969.5, dated Apr. 26, 2012, with English Translation.
(Continued)

*Primary Examiner* — Marsha D Banks Harold
*Assistant Examiner* — Elton Williams
(74) *Attorney, Agent, or Firm* — Lempia Summerfield Katz LLC

(57) ABSTRACT

The invention relates to a method for operating a communication network (101), in particular an Ethernet network. Network devices (1) which are coupled to the network comprise a switch device (4), a first and a second control device (2, 3) which are coupled to the switch device (4), and the switch device (4) comprises for the first and the second control device (2, 3) a respective input port (10, 14) and emitter port (9, 13) for sending and receiving data via the communication network (6). Ring-shaped communication paths for data are provided so that redundant data can be transmitted in different directions and checked for consistency. An improved protection against failure and error analysis in the event of transmission errors are ensured by
(Continued)

the ring-shaped structure using bidirectional communication paths. The invention further relates to a network arrangement (101) comprising several corresponding network devices (100, 200, 300) which operate according to the method.

18 Claims, 6 Drawing Sheets

(51) Int. Cl.
*G06F 11/16* (2006.01)
*H04L 12/40* (2006.01)
*H04L 12/931* (2013.01)
*G06F 11/20* (2006.01)

(52) U.S. Cl.
CPC ............ *H04L 45/24* (2013.01); *H04L 49/351* (2013.01); *G06F 11/2005* (2013.01); *H04L 2012/40273* (2013.01)

(58) Field of Classification Search
CPC . H04L 2012/40215; H04L 2012/40241; H04L 2012/402373; H04L 49/351; H04L 49/552; H04L 1/22; H04L 49/555; G06F 11/1633; G06F 11/181; G06F 11/182; G06F 11/2005; G06F 11/004; G05B 9/03
See application file for complete search history.

(56) References Cited

U.S. PATENT DOCUMENTS

| | | |
|---|---|---|
| 7,492,720 B2 | 2/2009 | Pruthi et al. |
| 7,613,108 B2 | 11/2009 | Takehara et al. |
| 8,102,782 B2 | 1/2012 | Pruthi et al. |
| 8,873,410 B2 | 10/2014 | Pruthi et al. |
| 2002/0105911 A1 | 8/2002 | Pruthi et al. |
| 2004/0153861 A1* | 8/2004 | Ohno ..................... H04L 12/43 714/43 |
| 2005/0129037 A1 | 6/2005 | Zumsteg et al. |
| 2005/0157710 A1 | 7/2005 | Rieckmann |
| 2006/0116803 A1* | 6/2006 | Armbruster .............. G05B 9/03 701/48 |
| 2006/0162986 A1 | 7/2006 | Disser et al. |
| 2007/0286075 A1 | 12/2007 | Shoham et al. |
| 2009/0122812 A1 | 5/2009 | Steiner et al. |
| 2009/0232016 A1 | 9/2009 | Pruthi et al. |
| 2009/0323704 A1* | 12/2009 | Hall ........................ H04L 12/42 370/401 |
| 2011/0026411 A1* | 2/2011 | Hao ................... H04L 12/40189 370/249 |
| 2012/0092343 A1 | 4/2012 | Pruthi et al. |

FOREIGN PATENT DOCUMENTS

| | | |
|---|---|---|
| CN | 102045218 A | 5/2011 |
| DE | 10243713 A1 | 4/2004 |
| DE | 102006061063 B4 | 9/2011 |
| EP | 1548992 A1 | 6/2005 |
| EP | 1297678 B1 | 8/2005 |
| EP | 2228723 A1 | 9/2010 |
| JP | 2005354514 A | 12/2005 |
| JP | 2007214796 A | 8/2007 |
| JP | 2007525107 A | 8/2007 |
| JP | 2008131137 A | 6/2008 |
| WO | WO2004029737 A1 | 4/2004 |
| WO | WO2005053223 A2 | 6/2005 |
| WO | WO2006002695 A1 | 1/2006 |
| WO | WO2009098616 A1 | 8/2009 |

OTHER PUBLICATIONS

Japanese Office Action cited in 2014-531160, dated Jan. 5, 2015, with English Translation.
Chinese Office Action cited in 201280045559.5, dated Jan. 21, 2015, with English Translation.

\* cited by examiner

METHOD FOR OPERATING A COMMUNICATION NETWORK, AND NETWORK ARRANGEMENT

The present patent document is a § 371 nationalization of PCT Application Serial Number PCT/EP2012/067110, filed Sep. 3, 2012, designating the United States, which is hereby incorporated by reference. This patent document also claims the benefit of DE 10 2011 082 969.5, filed on Sep. 19, 2011, which is also hereby incorporated by reference.

BACKGROUND

The present embodiments relate to operating a communication network.

Communication networks are being used to an ever greater extent for measuring, controlling and regulating complex technical systems. By way of example, networks are increasingly used in motor vehicles in order to form vehicle control systems. Corresponding complex and safety-relevant technical systems make great demands on the availability of the control elements provided as network devices. When single components (e.g., sensors or control devices) fail, this must not result in the failure of the overall system. Particular relevance to safety applies to drive by wire systems, in which the steering wheel position is converted into wheel positions by electric motor using a network coupling of sensor, control and actuator devices.

In the past, redundant designs of particularly critical components have been used, so that in the event of an error, the respective backup or redundant component may undertake the respective task. When there are a plurality of redundant components, only one of the two or more control devices is to have the respective control sovereignty. Conflicting control commands are not to arise for the same control functionalities. It is therefore desirable for all the control components to have the same information or data in the network.

In this respect, errors in the form of inconsistent data, which may be corrupt in the event of data transmission via the network that is used, for example, are to be recognized. A standard network environment that is in widespread use is based on the Ethernet protocol. The use of Ethernet infrastructures has the advantage that standardized network devices and methods may be used. In the past, however, proprietary data buses were also used in order to link control components having internal redundancy (e.g., duplicate functionality) to one another.

By way of example, DE 102 43 713 A 1 discloses a redundant controller arrangement. In this case, controllers networked via a data bus that have redundant control functions are provided. The redundant controllers are coupled to the data bus via isolator switches, so that in a particular assessment situation the respective control device is connected or decoupled. In this case, DE 102 43 713 A1 provides redundant data bus systems, with redundant control components in a respective network device. A similar approach is followed by WO 2006/002695 A1. Based on the prior art, a duplicate communication system, in which information supplied by a subscriber is received by all the subscribers, is used in this respect. A drawback in this case is the use of duplicate data buses, such as FlexRay or CAN.

SUMMARY AND DESCRIPTION

The scope of the present invention is defined solely by the appended claims and is not affected to any degree by the statements within this summary.

It would be desirable to use known or standard communication network protocols, with errors during the data communication being able to be recognized quickly and reliably.

The present embodiments may obviate one or more of the drawbacks or limitations in the related art. For example, an improved method and/or a network arrangement is provided.

A method for operating a communication network to which network devices are coupled is provided. A respective network device includes a switch device, and a first control device and a second control device coupled to the switch device. The switch device for the first and second control devices has a respective reception port and transmission port for sending and receiving data via the communication network.

The method includes producing first data by the first control device and second data by the second control device. The first data and the second data are linked to one another by a prescribed coding. The method includes sending the first data from the first control device via the switch device to the second control device and sending the second data from the second control device via the switch device to the first control device. The method also includes sending the first data and the second data via a first communication path from the transmission port of the switch device for the first control device to the reception port of the switch device for the second control device. The method includes sending the first data and the second data via a second communication path from the transmission port of the switch device for the second control device to the reception port of the switch device for the first control device.

In this case, the data on the first and second communication paths pass through the same network devices in opposite directions.

The communication network may include an Ethernet infrastructure. The switch device may also be referred to as bridge device or router device. In the case of network devices, reference is made to network nodes, network components or network elements.

Suitable control devices provided in the network devices are a CPU, a microprocessor or other programmable circuits, for example. A control device may also be a sensor device or actuator device.

The communication network or network protocol may provide point-to-point connections from one subscriber or one network device to another. In this case, bidirectional or duplex communication may be provided.

The first and second data, which are linked to one another by a prescribed coding, may be produced by bit inversion, for example. The prescribed coding allows the two data items to be checked for consistency with one another. If the data transfer via the network, for example, provides that one of the data items (e.g., packets) has a disturbance, this may be recognized by comparing the disturbance with the respective other data item (packet) taking account of the respective coding.

In the case of Ethernet-based communication networks, for example, bidirectional communication (e.g., duplex communication) may be provided. In this respect, the first communication path runs from the transmission port of the switch device of the first controller to the reception port of the switch device of the second controller, and the second communication path runs from the transmission port of the switch device of the second controller to the reception port of the switch device of the first controller. The first communication path runs in a ring shape, for example, via further switch devices or further network devices via the communication network. The second communication path runs through the network devices in the opposite direction. In this respect, redundant sending and a check on the operability of all the network devices involved become possible. In one embodiment, the first and second data are routed from the first control device to the second control device or vice versa exclusively via the switch device within the network device.

The method for operating a communication network (e.g., on an Ethernet basis) results in a ring structure. The communication directions that are obtained for the Ethernet ring are used. In the case of error in one of the switch devices of a network device that are connected to a control unit, only one of the directions may then be affected, so that a consistent data item or data continue(s) to be transmitted. By comparing the data sent on different communication paths (e.g., which data are linked to one another by a coding), flexible and reliable error analysis may be performed. The control components or devices that have led to an error may be determined. These may be passivated or switched off.

In embodiments of the method, the method also includes sending the first data and the second data via the transmission port of the switch device for the first control device to the reception port of the switch device for the second control device via at least one further switch device of a further network device having a first and a second control device. The method also includes sending the first data and the second data via the transmission port of the switch device for the second control device to the reception port of the switch device for the first control device via at least one further switch device of a further network device having a first and a second control device.

In this case, data received in a respective further switch device at a reception port for the second control device of the further switch device is forwarded to a transmission port for the first control device of the further switch device. Data received at a reception port for the first control device of the further switch device are forwarded to a transmission port for the second control device of the further switch device.

The encoded and coded date are therefore sent from a first channel that starts from a first control device, to a channel that is associated with the second control device. This also takes place vice versa. As a result, the sending control component is able to establish whether the respective other channel that is associated with the second (redundant) control device has the same data result. In this respect, whether the associated Ethernet switch or the switch device is working reliably may be established. If it is recognized that the switch device associated with the control device is acting erroneously, the sending control device may passivate itself.

The method may also include comparing the first data with the second data in the first and/or second control device in order to produce a comparison result, and passivating the network device based on the comparison result.

If it is recognized that the first and second data are not consistent with one another (e.g., not linked to one another by the prescribed coding), an error during the data transmission or production may be recognized.

The method may also include fresh sending of the first and second data via the first and second communication paths.

If, for example, data is not recognized again or received by the sending control device in a communication cycle, repeated sending and checking for correctly received data may infer an erroneous network component that is present in the communication path.

The method may also involve the first data and the second data being received at input ports for different control devices in a further network device and the received data being compared with one another.

In one embodiment, the method for operating the network arrangement also includes the display of an error message if compared first data and second data are not linked to one another by the prescribed coding.

A network arrangement having a plurality of network devices is also provided. The network devices are coupled to a communication network (e.g., an Ethernet infrastructure), and a respective network device includes a switch device, a first control device, and a second control device. The switch device is coupled to the control devices, and the switch device includes a respective reception port and transmission port for the first and second control devices for the purpose of sending and receiving data via the communication network. The network devices are set up to perform a method, as described above.

The network arrangement may be part of a vehicle.

The network devices may be sensor devices or actuator devices. Embodiments of sensor devices are rotation speed sensors, brake control devices, or switching control devices. In one embodiment, control devices that allow drive by wire, for example, may be used. In this case, steering or acceleration pulses, for example, are transferred electronically to appropriate actuators via the network, so that the desired reaction by the vehicle starts.

Overall, a particularly reliable network arrangement that works reliably even in the event of faults on communication channels is obtained. The redundant ring-shaped communication path device allows consistent controller communication and low-involvement error analysis and correction.

In embodiments of the network arrangement, at least one network device is equipped with a first and a second switch device. The first switch device is associated with the first control device, and the second device is associated with the second control device. In this case, the switch devices respectively include at least two ports, and the switch devices are communicatively coupled to one another. The coupling may be effected internally in the network device or else by transmission and input ports on the switch devices.

Further embodiments of the network arrangement may also be provided with simple network devices having a respective control device and switch device in the network arrangement. Simple network devices do not have a redundant control device in this case and may be provided for less safety-relevant functions.

The network devices may each be in the form of a single FPGA, ASIC, IC chip, or hardwired microcircuit.

In addition, a computer program product that prompts the performance of the method for operating a network arrangement, as explained above, on one or more program-controlled devices, is provided.

A computer program product such as a computer program may be provided or supplied as a storage medium, such as a memorycard, USB stick, CD-ROM or DVD, or else in the form of a downloadable file from a server in a network, for example. This may be effected in a wireless communication network, for example, by the transmission of an appropriate file with the computer program product or the computer program. A suitable program-controlled device is, for example, a network device, as described above.

Further possible implementations also include combinations, which are not explicitly cited, of method steps, features or embodiments, of the network arrangement, of the network device or of a network node described above or below for the exemplary embodiments. In this case, a person skilled in the art will also add or modify individual aspects as improvements or additions for one or more of the present embodiments.

DETAILED DESCRIPTION

In the figures, elements that are the same or have the same function have been provided with the same reference symbols, unless stated otherwise.

Figure 1:
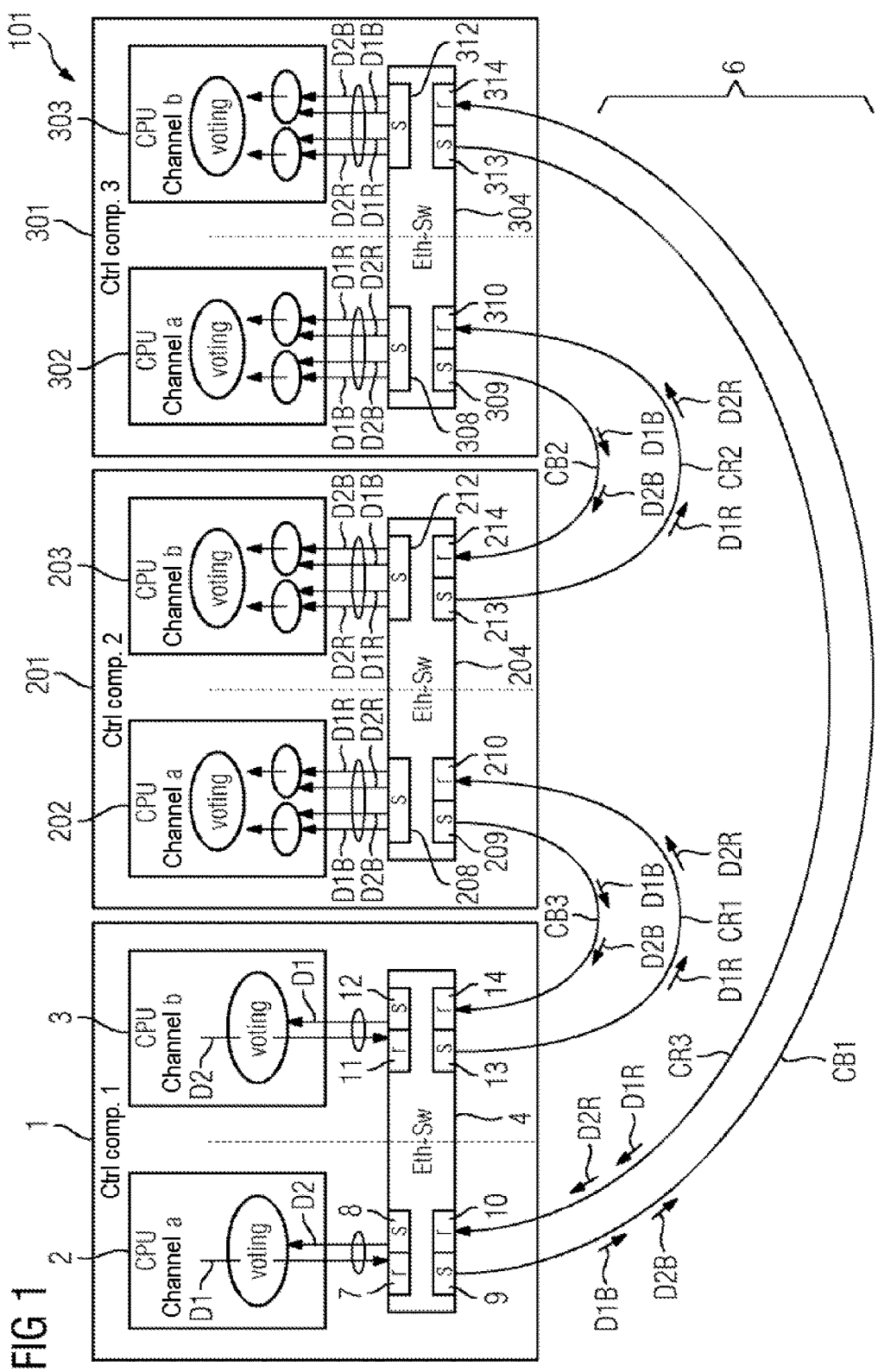
FIG. 1 shows a schematic illustration of a first embodiment of a network arrangement.

FIG. 1 shows one embodiment of a network arrangement. The figures also serve to explain the method for operating the network arrangement.

FIG. 1 shows a network arrangement 101 that may be used in a vehicle as an Ethernet network, for example. In this case, three network devices 1, 201, 301 are shown by way of example. The network devices 1, 201, 301 may be control components, for example. The network devices 1, 201, 301, which are subsequently also referred to as network nodes or control components, each have redundant control devices 2, 3, 202, 203, 302, 303. The network devices 1, 201, 301 may also be referred to as subscribers in the network.

The control devices 2, 3, 202, 203, 302, 303 are customized to perform particular tasks or functions. This may be a sensor detection or an actuator, for example. The control devices 2, 3, 202, 203, 302, 303 may be implemented as CPUs or microprocessors. By way of example, the control component 1 may be set up to detect a pedal state or a steering movement in the vehicle. The network devices 1, 201, 301 each have an internal switch device 4, 204, 304. The respective control device 2, 3, 202, 203, 302, 303 may be coupled to transmission ports 8, 12, 208, 212, 308, 312 of the respective switch device, which is in the form of an Ethernet switch 4, 204, 304.

The respective redundant control devices 2, 3, 202, 203, 302, 303, which are also referred to as CPUs or processors, may receive and evaluate data from the network 6 via the respective switch devices 4, 204, 304. For the purpose of coupling to the network infrastructure or the actual communication network 6, the switch devices 4, 204, 304 are equipped with transmission ports 9, 13, 209, 213, 309, 313 and reception ports 10, 14, 210, 214, 310, 314.

The control component or network device 1 includes a switch device 4 having further reception ports 7, 11. The switch device 4 is respectively associated with one of the CPUs 2, 3. By way of example, the control component or network device 1 may send a control signal or control data to a further control component in the network. In this case (e.g., in the case of safety-relevant applications in motor vehicles such as drive by wire), the control data is to be present consistently on all the network nodes.

Inside the network component, the redundantly produced control data D1 and D2 are aligned. The CPU 2 supplies data D1, and the CPU 3 supplies data D2. In this case, the data are linked to one another by a coding. In other words, the data D1 is obtained from the data D2 and vice versa using a mathematical operation. By way of example, simple bit inversion may be provided, so that the data D1 is the inverse of the data D2 and vice versa.

The switch device 4 is used to transmit the data D1 from the CPU 2 to the CPU 3. This is effected by transfer of the data D1 to the reception port 7 of the switch device 4, which routes the data via the transmission port 12 to the CPU 3. In the same way, the data D2 is transferred from the CPU 3 to the associated reception port 11, and the switch device 4 forwards the data via the transmission port 8 to the CPU 2. A consistency check may thus take place by virtue of the data D1 and D2 being compared with one another in each case in the CPU 2 and in the CPU 3. Provided that the data are consistent with one another (e.g., match modulo the prescribed coding; bit inversion), it may be assumed that the data reception via the ports 7 and 11, the data transmission via the ports 8 and 12, the switch device 4 for the data interchange between these ports, and the CPUs 2, 3 are working correctly. If the comparison result shows that the data D1 and D2 are inconsistent with one another, this indicates an error in the CPUs 2, 3 or in the switch device. A possible reaction to this to safeguard data consistency is the passivation (e.g., deactivation) of the control component 1.

The network arrangement 101 is also configured for ring-shaped communication paths. The possibility, which exists particularly in the case of Ethernet infrastructure, of point-to-point connections among the subscribers or network devices allows the production of two separate communication rings that share only the respective switch devices, but do not use shared ports therein at the reception and transmission ends. In the exemplary embodiment in FIG. 1, a first communication path that is composed from the segments CB1, CB2 and CB3 is obtained. The data D1 and D2 run via these segments CB1, CB2 and CB3, as indicated by the arrows D1B and D2B. In this case, the suffix B represents the communication path B.

In addition, a communication path that is made up of the segments CR1, CR2 and CR3 runs in the opposite communication direction. This path is likewise used to send the data D1 and D2, as indicated by the arrows D2R and D1R. In this case, the suffix R represents the communication path R.

The data D1 and D2 are therefore transmitted to all the control components 201, 301 that are present in the network via disjunct communication paths. Each CPU 202, 203, 302, 303 receives the coded and uncoded data D1, D2 via different communication paths (e.g., the two rings with opposite communication directions). Each CPU 202, 203, 302, 303 compares the received values for the data D1, D2 via a communication route or path.

By way of example, the CPU 303 receives the data D1B and D2B via the communication path CB1. These data are accepted at the input port 314 of the switch device 304. At the transmission port 312, the switch device 304 transfers the data D1B and D2B that have been received at the input port 314 to the CPU 303. At the CPU 303, the data D1B and D2B may be compared. If the data are consistent with one another, this is indicative of an error-free communication path CB1.

The CPU 303 also receives the data D1R and D2R via the second communication path, which is obtained from the segments CR1 and CR2. The data D1R and D2R are received by the switch device 304 at the reception port 310 and are output to the transmission port 312, which is associated with the CPU 303. A consistency check may again take place. The CPU 303 may perform a comparison or voting for the data received via the ring path CB1 and data received via the ring path CR1 and CR2. In the undisturbed case, the data D1R and D2R are consistent with one another, the data D1B and D2B are consistent with one another, and the data received via CB1 and via CR1-CR2 and individually established as being already consistent are consistent with one another. The result of this is that the underlying data D1 and D2, which have been produced by the CPU 2 or 3, are correct. If the comparisons or the votings of the data received via CB1 and via CR1-CR2 and individually established as being already consistent in the control component 3 or the CPUs 302, 303 reveal inconsistencies, a communication error may be inferred.

Similar consistency checks take place in the control component 201 or the CPUs or control devices 202, 203. If one of the switch devices 4, 204, 304 involved operates erroneously or fails, a corresponding network error may be recognized if the data D1, D2 are sent repeatedly. A plurality of communication cycles with different data from different control devices may be sent on the network 6. Based on other data, which is not shown in FIG. 1, the respective control components 201, 301 may establish whether or not their own switch 204, 304 is defective. In this respect, different error scenarios may be recognized and dealt with.

The disjunct data paths CB1, CB2, CB3 and CR1, CR2, CR3 provide that errors during the transmission occur only independently of one another. The embodiment as an Ethernet ring for the network nodes or components 1, 201, 301 provides largely consistent communication by controllers that have redundant control devices 2, 3, for example.

Figure 2:
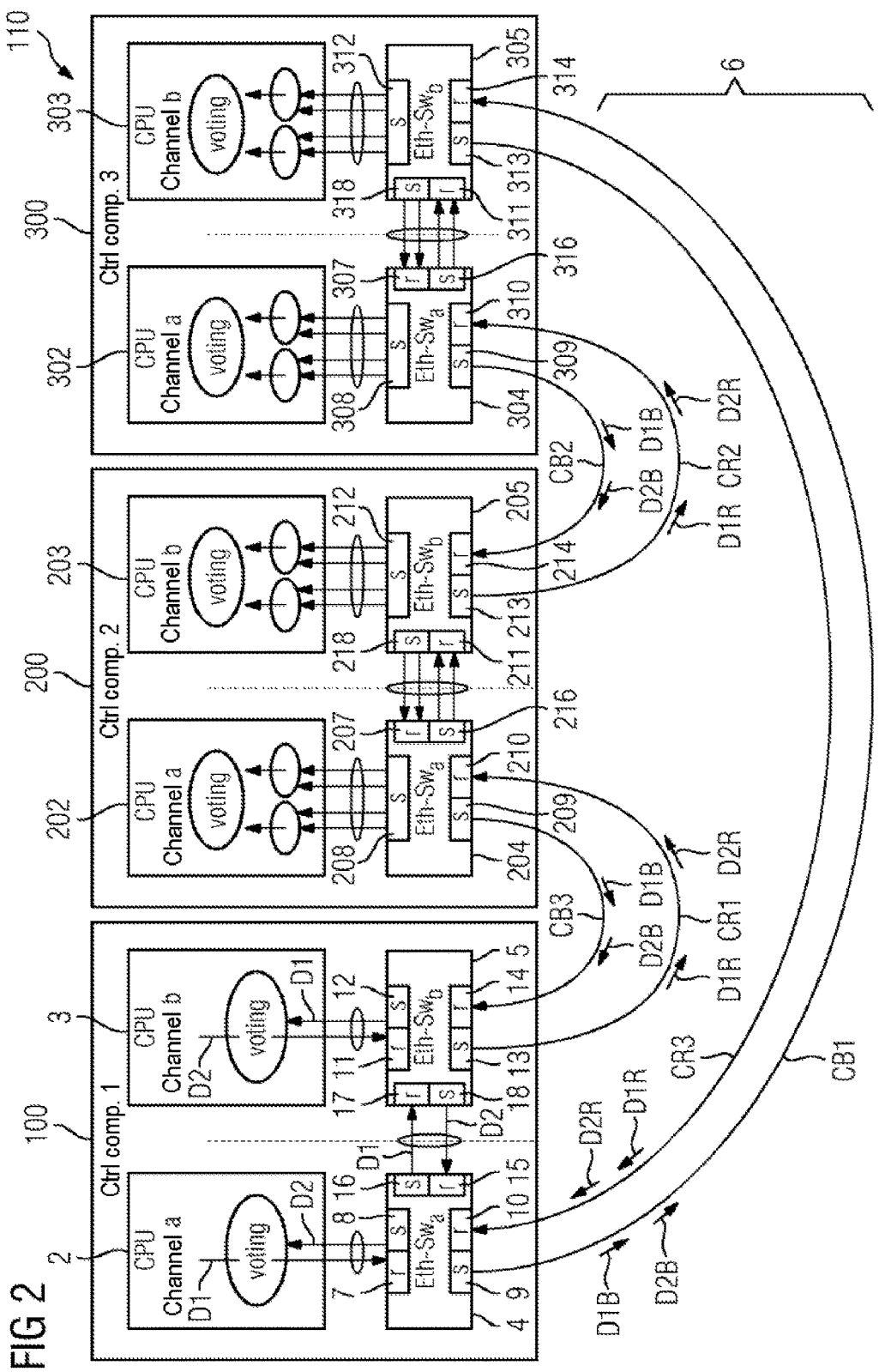
FIG. 2 shows a schematic illustration of a second embodiment of a network arrangement.

FIG. 2 shows one embodiment of a network arrangement 110 that is also suitable for performing the proposed method.

FIG. 2 essentially shows the same elements as have been addressed in relation to FIG. 1. However, the control components or network nodes or network devices 100, 200, 300 are equipped with redundant Ethernet switch devices 4, 5, 204, 205, 304, 305. This allows additional reliability to be attained in the data communication.

By way of example, the network device 100 includes a CPU 2 and an associated Ethernet switch device 4. The Ethernet switch device 4 has a reception port 7 and a transmission port 8 that are communicatively coupled to the CPU 2. A further transmission port 9 and reception port 10 are coupled to the network 6 for the purpose of sending and receiving data. Similarly, the CPU 3 has an Ethernet switch device 5 that has a reception port 11 and a transmission port 12 for coupling to the CPU 3. The Ethernet switch device 5 also has a transmission port 13 and a reception port 14 for coupling to the network 6. The transmission port and the reception port 15, 16, 17, 18 are provided on the Ethernet switches 4, 5 in order to couple the two switch devices 4, 5 to one another. In this case, the two switch devices 4, 5 are produced separately (e.g., as an FPGA or ASIC or microchip).

An internal consistency check in the control component 100 is performed by producing the data D1, transferring the data D1 to the Ethernet switch 4 and the port 7 and forwarding the data D1 via the port combination 16, 17 to the Ethernet switch 5, which delivers the data D1 to the CPU 3. Similarly, the data D2 is transmitted to the CPU 2 via the ports 11, 18, 15 and 8. In this respect, an internal consistency check may be performed via the consistent coding of the data D1 and D2 with one another.

Similarly, the control components 200 and 300 have separate switch devices 204, 205, 304, 305. The data transmitted between the two switches 204, 205 and 304, 305 are not provided with reference symbols in FIG. 2. From top to bottom, data D2B and D1B are respectively transmitted from the port 218 to the port 207. The data D1R and D2R are transmitted from the port 216 to the port 211. In the same way, data that correspond to D2B and D1B are received by the port 307 from the port 318. Data that correspond to D1R and D2R are received by the port 311 from the port 316.

As has already been explained for the embodiment that is shown in FIG. 1, the received data D1R and D2R and D1B and D2B are compared in the control components 200, 300 or the internal CPUs 202, 203, 302, 303. A check that is subsequently referred to as voting allows detailed and reliable error analysis and possibly passivation of erroneously operating network components, as has already been explained with reference to FIG. 1.

If the switch device 4 in the control component 100 fails completely, for example, no more data may be transmitted via the communication path CB1. The opposite communication path CR is then used only to receive the coded data information D2, since the original data D1 is no longer routed from the switch device 4 to the channel b or the switch device 305. From this error pattern, the reception CPUs may infer that the transmitter (e.g., the control component 1) is erroneous.

If a receiver switch (e.g., the switch device 204 in the control component 200) fails, then the CPU 202 receives nothing more in channel a, but in channel b receives all the data via CB1 and CB2 in full. From this error pattern, the control component 200 may infer that the control component 200 is defective and is shut down.

Figure 3:
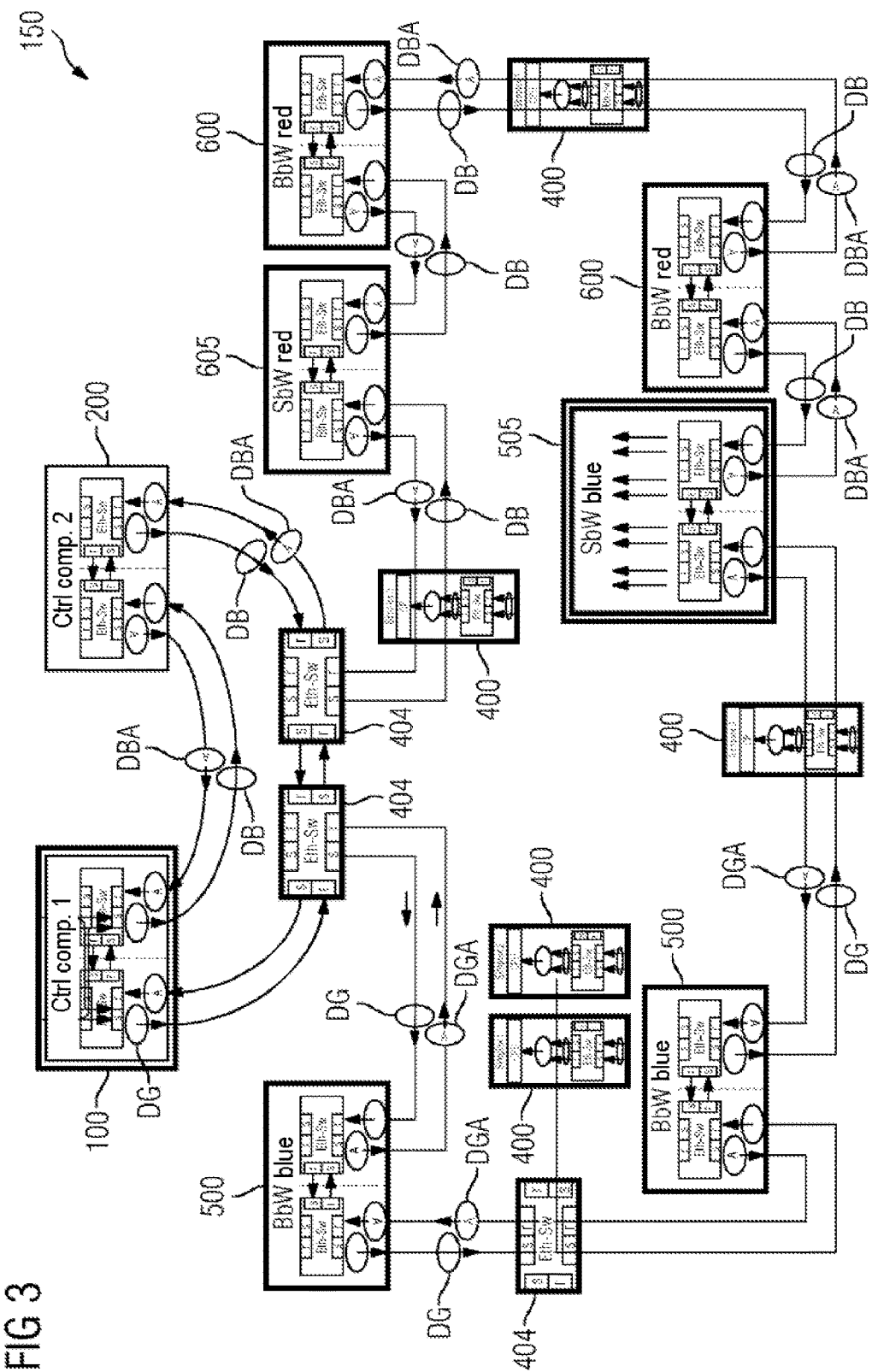
FIG. 3 shows a schematic illustration of a third embodiment of a network arrangement.

FIG. 3 shows an embodiment of a network arrangement 150. In this case, an extension for the connection of sensors and actuators in the network is indicated. FIG. 3 shows that a ring-shaped design of the Ethernet infrastructure is provided. In this case, network devices 100, 200, 500, 605, 600 are provided that are of similar design to the network devices shown in FIG. 2.

In addition, simple network components 400 are provided that have no redundant switches or CPUs. The simple network components 400 are provided by the symbol 400 as a Simplex.

Ethernet switch devices 404 are provided in the network arrangement 150.

In a vehicle application, brake actuators (BbB) or steer-by wire actuators (SbW), for example, are provided in redundant form. In the illustration in FIG. 3, the relevant actuators 500, 600, 605, 505 are respectively labeled "blue" or "red".

By way of example, the control component 100 is active in order to supply the SbW component 505 with control data.

The dual-ring-shaped arrangement, with the two individual rings being connected to one another at two different locations by Ethernet switch devices, results in two disjunct data buses that provide communication in different directions in the network ring. This is indicated by the arrows on the communication path segments. Data packets DG that are routed from the control component 1 to the Ethernet switch 404 to BbW blue 500 via the Ethernet switch 404 to BbW blue 500 and via the Simplex to SbW blue 505 are obtained. Redundant data packets DB are routed from the control component 100 via the control component 200 to the Ethernet switch 404 via the Simplex 400, via SbW red 605 and BbW red 600 and Simplex 400 to BbW red 600 and to SbW blue 505. DGA and DBA denote the return data packets.

In the case of the configuration of the network arrangement 150 that is shown in FIG. 3, the actuators 505, 605 are connected via Ethernet switches 404 of redundant design in the manner of an outer ring to a ring structure including the control components 100, 200 and the Ethernet switches 404.

The respective control commands or data are sent both in coded and uncoded form in the direction of the communication path DG or DGA (e.g., around to the left) and are sent via the second communication path DB or DBA (e.g., around to the right). Within the steer-by-wire control component 505, a comparison and subsequent voting take place, as has been explained with reference to FIGS. 1 and 2. Whether the control commands and data from the control component 1 are correct may thus be reliably recognized.

The control component SbW blue 505 likewise responds via both communication paths or directions with data DGA and DBA. All the actuators that are present in the network may be reached via two communication paths from any control component. The failure of one of the components in the network elements DG/DGA or DB/DBA may not result in the failure of the overall communication, since the packets DG/DGA and DB/DBA do not use shared network components.

By way of example, the simple network devices 400 are actuators that have no internal redundancies, since the respective function is noncritical. Simple network devices 400 may be coupled to the ring structure via spur lines with Ethernet switches 404. This is shown in FIG. 3 by way of example on the left-hand side for the simple network device 400, which is denoted by Simplex 1 and Simplex 2. In this respect, the ring structure may be combined with Ethernet spur lines in the motor vehicle.

Overall, the combination of Ethernet ring structures with coded communication (e.g., production of data that are linked to one another by a prescribed coding) produces a duplicate communication topology without the need to use dedicated twin infrastructures such as cables or lines. Errors in sending or receiving control components may be recognized quickly and reliably to an adequate degree. Overall, the proposed method and the network arrangements may be used to attain good data consistency in the overall system.

Figure 4:
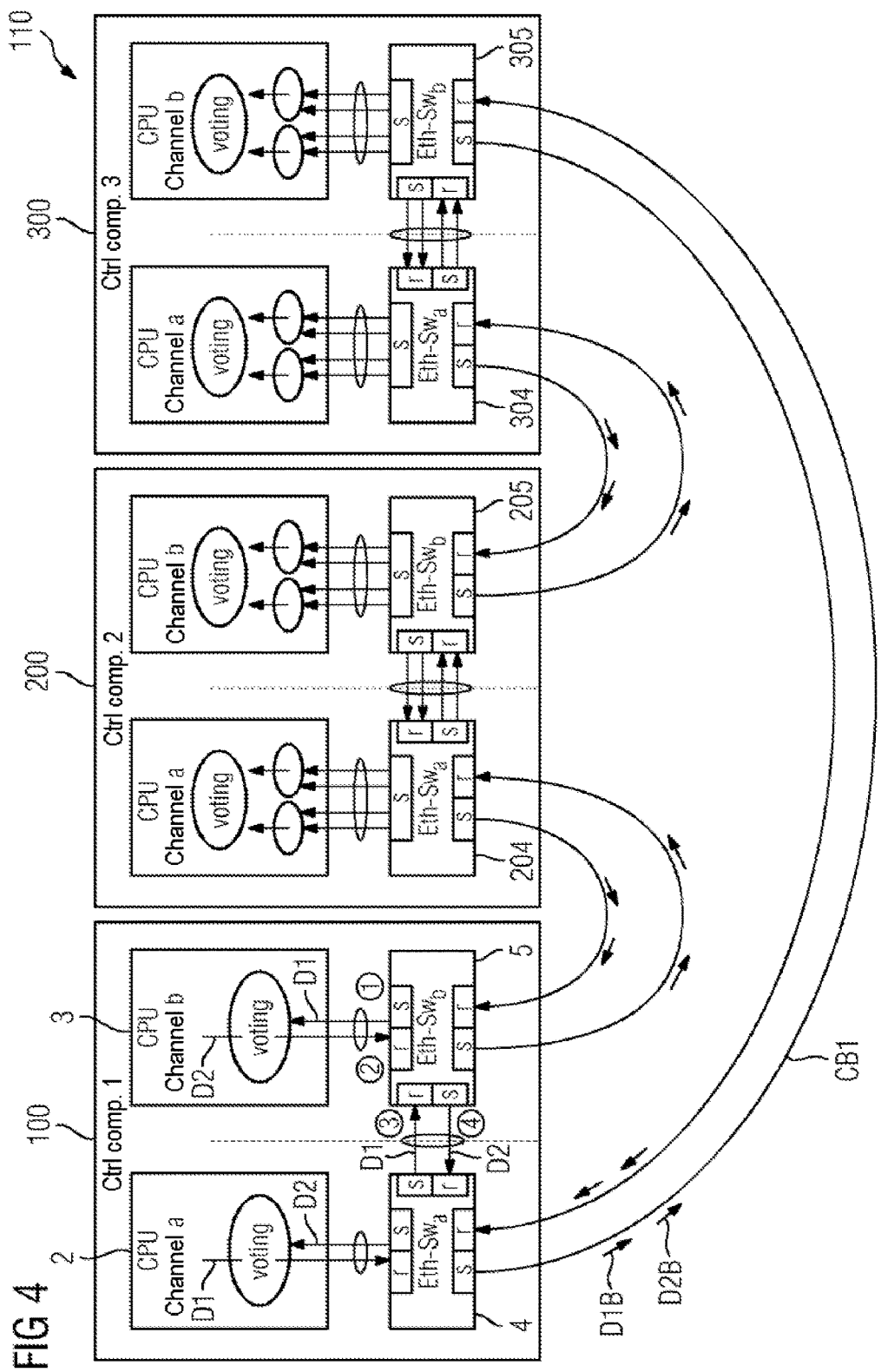
FIGS. 4-6 show schematic illustrations of the second embodiment of the network arrangement with communication processes to explain method aspects of an error analysis.
Figure 5:
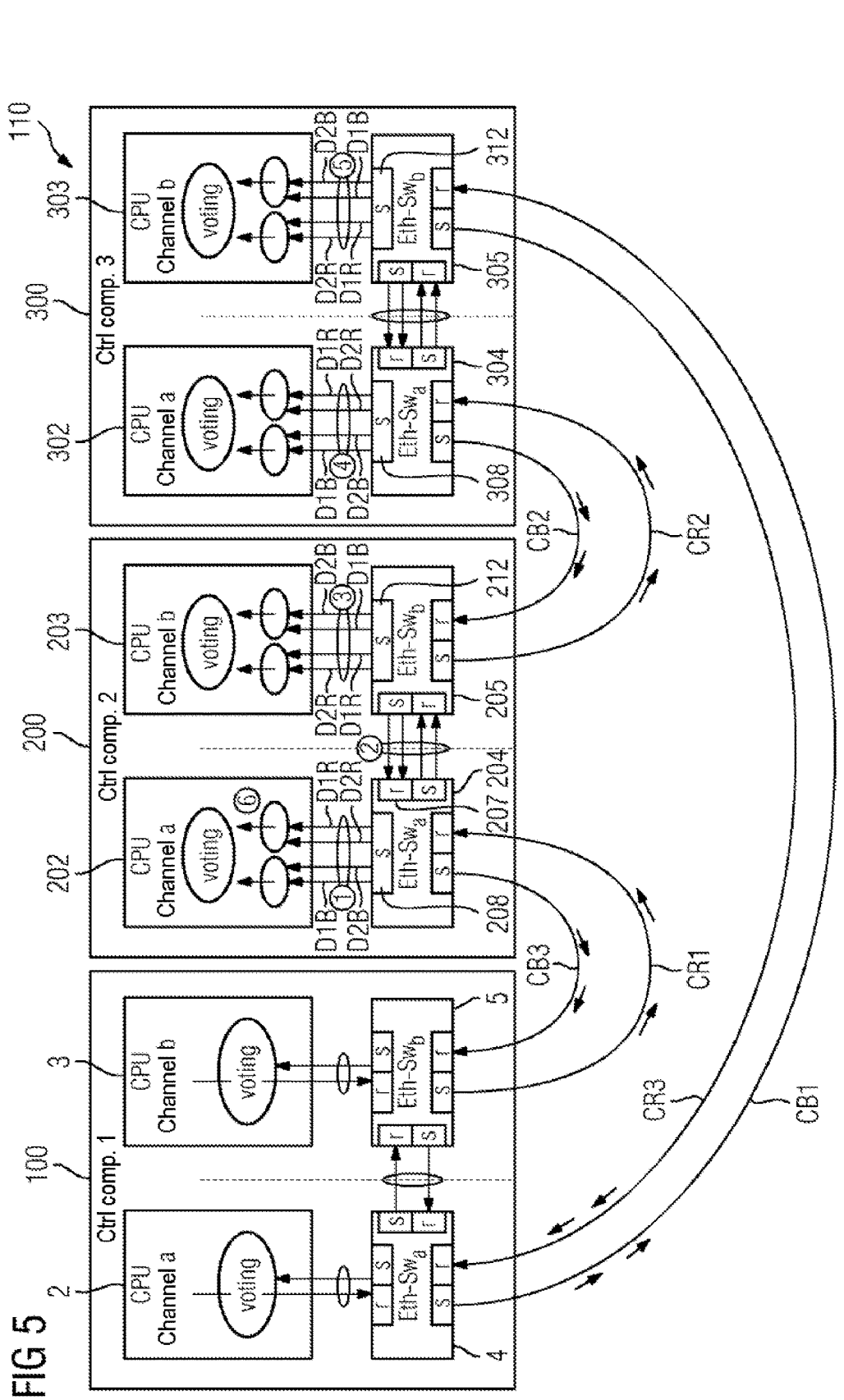
Figure 6:
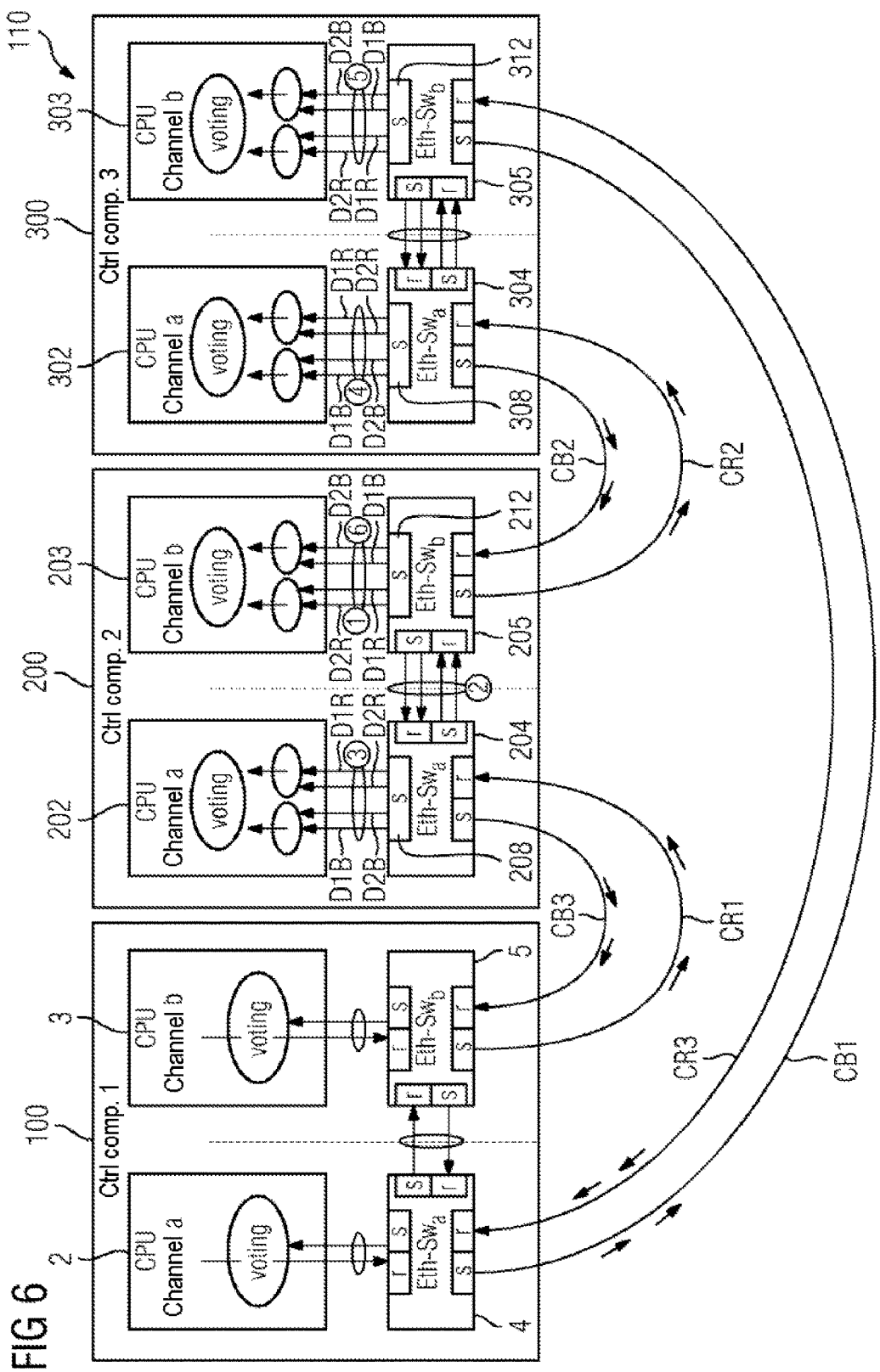

FIGS. 4, 5 and 6 provide a more detailed explanation of exemplary error scenarios for the network arrangement as shown in FIG. 2. In this case, some arrows, which represent the data transmission between various elements, are marked with circled numerals (1) to (4).

FIG. 4 considers the control component 100 with CPUs 2 and 3 and also the switch devices 4 and 5, and assumes an error in the switch device 5. It is shown that, in the case of errors in the data transmission with respect to arrows (1), (2), (3) and (4), still no inconsistency in the data arises. Provided that one of the arrows marked (1)-(4) or the corresponding transmitted data is/are erroneous, the consistency check in the CPU 2 or 3 will fail. This provides that the control component 100 is deactivated or passivated. This results in the control component 100 sending no further data, which is also accordingly registered by the other control components 200, 300 in the network or the network arrangement 110.

If all the arrows or communication paths marked (1)-(4) are error-free, it is to be inferred that the switch device 5 is internally erroneous. The remainder of the components of the system 110 may be assumed to be error-free (e.g., the probability of independent dual errors is deemed to be extremely low, as a result of which independent dual errors do not need to be considered in this context). In other words, it is assumed that the CPUs 2, 3 and the switch 4 are operating without error. This provides that the data D1B and D2B transmitted via the communication path or the communication segment CB1 are transmitted to the control components 200 and 300 correctly. In this respect, the control component 100 continues to be operative despite the fault in the Ethernet switch 5, and may be accordingly registered by the remainder of the control components 200, 300. Despite the indicated error in the switch component 5, all the data may be retrieved consistently in the network and are present consistently in the network devices 100, 200, 300.

FIG. 5 shows a further error situation in the switch device 204, the communication paths under consideration again being marked with circled numerals (1)-(6). If the data D1B and D2B at the location (1) are correct, the corresponding data D1B, D2B at the locations (2) and (3) are also correct. The same applies to the arrows at the locations (4) and (5): D1B and D2B at the ports 308 and 312 are consistent. This provides that both channels (e.g., channel a and channel b) in the control component 200 and also in the control component 300 recognize consistent status information from the control component 100. In other words, the control component 100 is correctly assessed as fully operational, and the CPUs 202, 203, 302, 303 contain consistent data from control component 100.

If one of the data items D1B or D2B at the location (1) is erroneous, the following scenarios are obtained.

Provided that the data D1R, D2R at the location (6) are inconsistent, the CPU 202 recognizes that no consistent status information or data are received from the control component 100. In this respect, an error in the control component 200 is inferred, since CPU 203 receives consistent data D1B and D2B. The control component 200 is passivated. By contrast, the control component 300 continues to be fully operational and is sent consistent status information from the control component 100.

If the data D1R and D2R at the location (6) are error-free, the CPU 202 receives consistent data D1R, D2R from the port 208, and the CPU 203 receives consistent data D1B, D2B from the port 212 of the respective switch device 204, 205. On the control component 300, at least the data D1R, D2R at the port 312 and also at the port 308 are consistent, since the occurrence of independent dual errors is essentially precluded. In this respect, consistent status data are provided by the control component 100 in the network.

FIG. 6 also shows a further potential error situation for the switch component 205 in a network arrangement 110. Again, the communication paths under consideration are marked with circled numerals (1)-(6). If the arrows DR1, DR2 marked at the location (1) supply correct data, then D1R, D2R along the two arrows are also each correct at positions (2) and (3). In the control component 200, the CPUs 202 and 203 therefore recognize consistent status information from the control component 100. Since a dual error is precluded, the data D1B, D2B on both CPUs 302 and 303 are correct. Hence, the CPUs 302 and 303 in the control component 300 recognize consistent status information from the control component 100. In this respect, all the elements of the network device 100 or control component 100 are operational.

If the data D1R and D2R that arrive at CPU 203 at the location (1) via port 212 are inconsistent, the following error scenarios are obtained.

Provided that the data D1B, D2B at the location (6) are inconsistent, the CPU 203 recognizes that no consistent status information is received from the control component 100. The control component 200 recognizes an error in the control component 200 and passivates the control component, since the CPU 203 has received consistent data neither from D1B, D2B nor from D1R, D2R, but the preclusion of a dual error provides that D1R, D2R supply consistent data to CPU 202. By contrast, the control component 300 continues to be fully operational and receives consistent status information from the control component 100 at the port 312 in the form of the data D1R and D2B.

Provided that the data D1R and D2R at the port 212 at the location (1) are inconsistent, and the two data items D1B and D2B at the port 212 at the location (6) are correct, the CPU 203 receives consistent data D1B and D2B, and the CPU 202 receives consistent data D1R and D2R at the port 208. In the case of the control component 300, at least the data D1B, D2B are then consistent both for CPU 302 and for CPU 303. In this respect, consistent data are present on all the control components of the network arrangement 100, 200, 300 despite the error.

All other cases of error have already been covered by the above explanations for reasons of symmetry.

Hence, the method and also the proposed network arrangement with the corresponding ring structure provide extremely highly consistent controller communication in safety-relevant applications. All possible single errors either do not result in consistent data being unable to be produced in one or more network devices, or may be localized within a communication cycle.

It is to be understood that the elements and features recited in the appended claims may be combined in different ways to produce new claims that likewise fall within the scope of the present invention. Thus, whereas the dependent claims appended below depend from only a single independent or dependent claim, it is to be understood that these dependent claims can, alternatively, be made to depend in the alternative from any preceding or following claim, whether independent or dependent, and that such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A method for operating a communication network for network devices that are coupled to the communication network, wherein a respective network device comprises a switch device with a first control device and a second control device that are coupled to the switch device, and wherein the switch device comprises a respective reception port and transmission port for each of the first control device and the second control device for sending and receiving data via the communication network, the method comprising:
producing first data by the first control device and second data by the second control device, wherein the first data and the second data are linked to one another by a coding comprising a bit inversion, such that the first data is obtained from the second data and the second data is obtained from the first data by the bit inversion;
sending the first data from the first control device via the switch device to the second control device and sending the second data from the second control device via the switch device to the first control device;
sending the first data and the second data via a first communication path in a first direction from the transmission port of the switch device for the first control device to the reception port of the switch device for the second control device; and
sending the first data and the second data via a second communication path that is the same as the first communication path but in a second direction opposite the first direction, from the transmission port of the switch device for the second control device to the reception port of the switch device for the first control device,
wherein the first data and the second data on the first communication path and the second communication path pass through same network devices in opposite directions and in reverse order to return to the first control device and the second control device.

2. The method of claim 1, further comprising:
sending the first data and the second data via the transmission port of the switch device for the first control device to the reception port of the switch device for the second control device via at least one further switch device of a further network device, the further network device comprising a first control device and a second control device; and
sending the first data and the second data via the transmission port of the switch device for the second control device to the reception port of the switch device for the first control device via the at least one further switch device of the further network device,
wherein data received in a respective further switch device at a reception port for the second control device of the further switch device are forwarded to a transmission port for the first control device of the further switch device, and data received at a reception port for the first control device of the further switch device are forwarded to a transmission port for the second control device of the further switch device.

3. The method of claim 1, further comprising:
comparing the first data with the second data in the first control device, the second control device, or the first control device and the second control device in order to produce a comparison result; and
passivating the network device based on the comparison result.

4. The method of claim 1, further comprising re-sending the first data and the second data via the first communication path and the second communication path.

5. The method of claim 1, further comprising:
receiving, in a further network device, the first data and the second data at input ports for different control devices; and
comparing the received first data and the received second data.

6. The method of claim 5, further comprising displaying an error message when the compared received first data and received second data are not linked to one another by the coding.

7. The method of claim 1, wherein the communication network is an Ethernet network.

8. A computer program product comprising a non-transitory computer readable storage medium that stores instructions for operation by program controlled devices to operate a communication network for network devices that are coupled to the communication network, wherein a respective network device comprises a switch device with a first control device and a second control device that are coupled to the switch device, and wherein the switch device comprises a respective reception port and transmission port for each of the first control device and the second control device for sending and receiving data via the communication network, the instructions comprising:
producing first data by the first control device and second data by the second control device, wherein the first data and the second data are linked to one another by a coding comprising a bit inversion, such that the first data is obtained from the second data and the second data is obtained from the first data by the bit inversion;

sending the first data from the first control device via the switch device to the second control device and sending the second data from the second control device via the switch device to the first control device;

sending the first data and the second data via a first communication path in a first direction from the transmission port of the switch device for the first control device to the reception port of the switch device for the second control device; and sending the first data and the second data via a second communication path in a second direction from the transmission port of the switch device for the second control device to the reception port of the switch device for the first control device, the second communication path flowing through a same number of network devices as the first communication path, wherein the first direction is opposite the second direction, and wherein the first data and the second data on the first communication path and the second communication path pass through same network devices in opposite directions and in reverse order to return to the first control device and the second control device.

9. A non-transitory data storage medium having a stored computer program executable by a device to operate a communication network for network devices that are coupled to the communication network, wherein a respective network device comprises a switch device with a first control device and a second control device that are coupled to the switch device, and wherein the switch device comprises a respective reception port and transmission port for each of the first control device and the second control device for sending and receiving data via the communication network, the computer program including commands comprising:

producing first data by the first control device and second data by the second control device, wherein the first data and the second data are linked to one another by a coding comprising a bit inversion, such that the first data is obtained from the second data and the second data is obtained from the first data by the bit inversion;

sending the first data from the first control device via the switch device to the second control device and sending the second data from the second control device via the switch device to the first control device;

sending the first data and the second data via a first communication path in a first direction from the transmission port of the switch device for the first control device to the reception port of the switch device for the second control device; and sending the first data and the second data via a second communication path that is the same as the first communication path but in a second direction opposite the first direction, from the transmission port of the switch device for the second control device to the reception port of the switch device for the first control device, wherein the first data and the second data on the first communication path and the second communication path pass through same network devices in opposite directions and in reverse order to return to the first control device and the second control device.

10. A network arrangement comprising:
a plurality of network devices that are coupled to a communication network, wherein a respective network device of the plurality of network devices comprises a switch device with a first control device and a second control device that are coupled to the switch device, and wherein the switch device comprises a respective reception port and transmission port for each of the first control device and the second control device for sending and receiving data via the communication network, and wherein the network devices are configured to:
produce first data by the first control device and second data by the second control device, wherein the first data and the second data are linked to one another by a coding comprising a bit inversion, such that the first data is obtained from the second data and the second data is obtained from the first data by the bit inversion;

send the first data from the first control device via the switch device to the second control device and sending the second data from the second control device via the switch device to the first control device;

send the first data and the second data via a first communication path in a first direction from the transmission port of the switch device for the first control device to the reception port of the switch device for the second control device; and send the first data and the second data via a second communication path in a second direction from the transmission port of the switch device for the second control device to the reception port of the switch device for the first control device, the second communication path flowing through a same number of network devices as the first communication path wherein the first direction is opposite the second direction, and wherein the first data and the second data on the first communication path and the second communication path pass through same network devices in opposite directions and in reverse order to return to the first control device and the second control device.

11. The network arrangement of claim 10, wherein the network arrangement is part of a vehicle.

12. The network arrangement of claim 10, wherein the plurality of network devices are sensor devices or actuator devices for operating a vehicle.

13. The network arrangement of claim 10, wherein at least one network device of the plurality of network devices comprises a first switch device and a second switch device,
wherein the first switch device is associated with the first control device, and the second switch device is associated with the second control device, and
wherein each switch device of the first switch device and the second switch device comprises at least two ports, and the first switch device and the second switch device are communicatively coupled to one another.

14. The network arrangement of claim 10, further comprising at least two ring-shaped network arrangement elements,
wherein the at least two network arrangement elements are coupled to one another at at least two different locations by switch devices.

15. The network arrangement of claim 10, further comprising simple network devices, the simple network devices comprising a respective control device and switch device.

16. The network arrangement of claim 14, wherein simple network devices are coupled to a ring-shaped network arrangement element of the at least two ring-shaped network arrangement elements via spur lines using switch devices.

17. The network arrangement of claim 10, wherein each network device of the plurality of network devices is in the form of a single FPGA, ASIC, IC chip or hardwired microcircuit.

18. The method of claim 1, wherein the second data is an inverse of the first data.

* * * * *